United States Patent
Miller et al.

(10) Patent No.: US 10,278,369 B2
(45) Date of Patent: *May 7, 2019

(54) METHOD AND SYSTEM FOR FEEDING AN ANIMAL A CONSUMABLE FEED PRODUCT AND VEGETATION FROM A CONTAINER

(71) Applicant: PURINA ANIMAL NUTRITION LLC, Shoreview, MN (US)

(72) Inventors: Bill L. Miller, Labadie, MO (US); Michael S. Burr, Marthasville, MO (US); Gordon Ballam, St. Louis, MO (US); Jodi Joy Eineichner Moore, Shoreview, MN (US); Mikel Roeder, Springdale, AR (US); Erin Venable, Scott City, MO (US)

(73) Assignee: Purina Animal Nutrition LLC, Shoreview, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/705,743

(22) Filed: Sep. 15, 2017

(65) Prior Publication Data

US 2018/0000051 A1 Jan. 4, 2018

Related U.S. Application Data

(63) Continuation of application No. 13/958,220, filed on Aug. 2, 2013, now Pat. No. 9,795,120.

(51) Int. Cl.
  *A01K 39/01* (2006.01)
  *A01K 5/01* (2006.01)

(52) U.S. Cl.
  CPC .............. *A01K 39/01* (2013.01); *A01K 5/01* (2013.01)

(58) Field of Classification Search
  CPC ........ A01K 5/01; A01K 5/008; A01K 5/0121; A01K 39/01; A01G 9/02; A01C 1/04; A01C 1/044
  See application file for complete search history.

(56) References Cited

U.S. PATENT DOCUMENTS 5,073,401 A 12/1991 Mohr
5,158,809 A * 10/1992 Proctor .................... A01C 1/04
  428/23

(Continued)

FOREIGN PATENT DOCUMENTS

WO   WO-2009156855 A2 * 12/2009 ............... A01C 1/04

OTHER PUBLICATIONS

"Growing Herbs for Pet Birds", Aug. 25, 2008, <http://www.birds.com/blog/growingherbsforpetbirds/>.

*Primary Examiner* — Michael H Wang
(74) *Attorney, Agent, or Firm* — Dorsey & Whitney LLP

(57) ABSTRACT

Consumable feed products and vegetation are delivered to animals using a single container in which the container holds the feed product and is used to deliver the feed and which includes ungerminated seeds embedded in the container body. The seeds are caused to germinate and produce vegetation from the container body, and the germinated seeds and/or vegetation is fed to the animal. Multiple containers may be used simultaneously so that while the consumable feed product from one container is used to feed an animal, another container may be used to grow vegetation or deliver vegetation to the animal. Confined birds such as poultry and chicks may benefit from ingesting feed and vegetation produced from such containers.

20 Claims, 1 Drawing Sheet

(56) References Cited

U.S. PATENT DOCUMENTS

| | | | |
|---|---|---|---|
| 5,274,951 A | 1/1994 | Besing | |
| 5,316,313 A | 5/1994 | Moore | |
| 6,009,663 A | 1/2000 | Kazemzadeh | |
| 2002/0040670 A1 | 4/2002 | Hornak | |
| 2006/0107561 A1 | 5/2006 | Menzie | |
| 2006/0265952 A1 | 11/2006 | Christal | |
| 2008/0046277 A1 | 2/2008 | Stamets | |
| 2008/0184938 A1 | 8/2008 | Lipscomb et al. | |
| 2009/0155421 A1 | 6/2009 | Berry | |
| 2011/0302835 A1* | 12/2011 | Ray, III | A01C 1/04 47/56 |
| 2012/0181247 A1 | 7/2012 | Grulke et al. | |
| 2013/0068636 A1 | 3/2013 | Wu | |
| 2016/0135358 A1* | 5/2016 | Seacord | A01C 1/044 47/56 |

\* cited by examiner

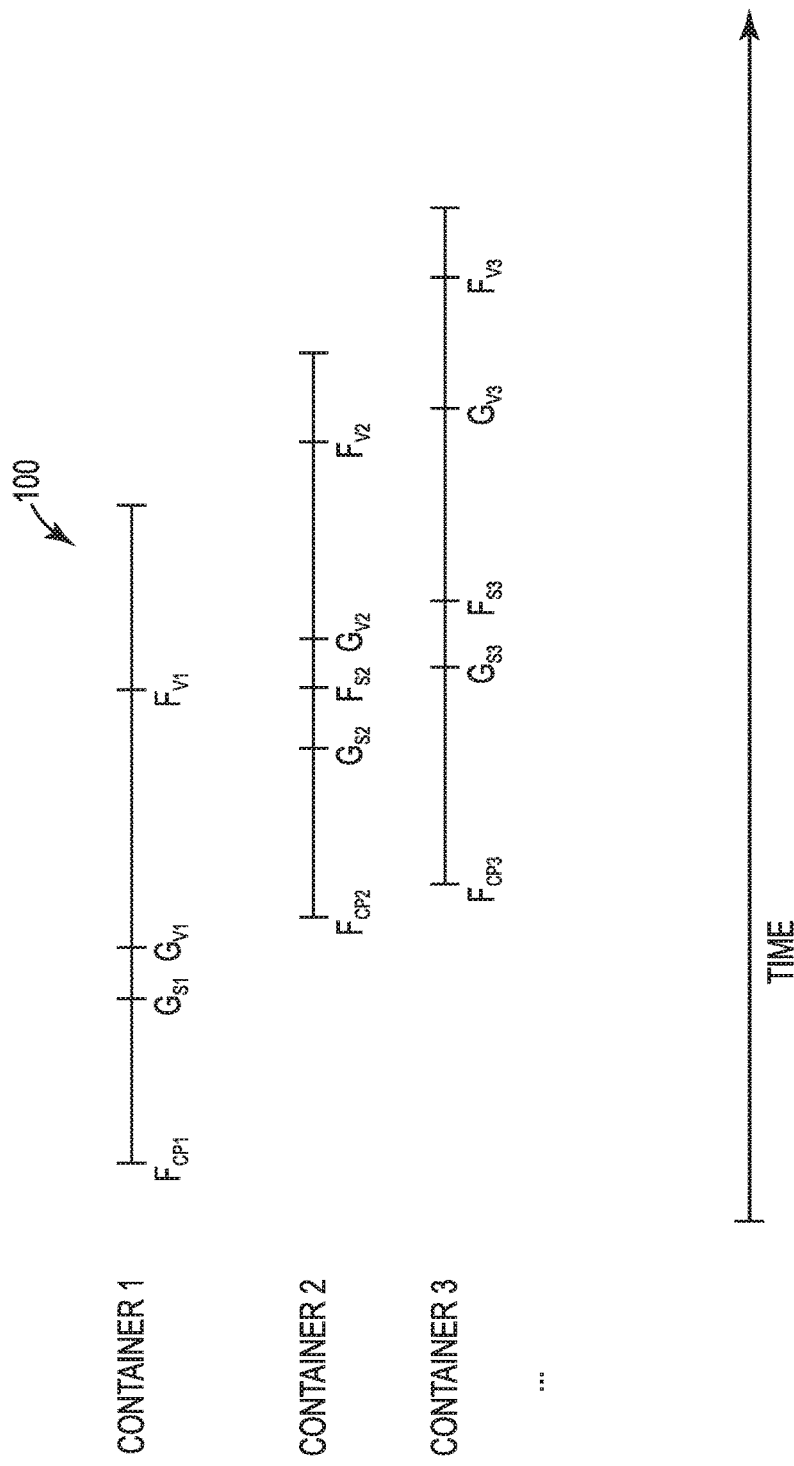

METHOD AND SYSTEM FOR FEEDING AN ANIMAL A CONSUMABLE FEED PRODUCT AND VEGETATION FROM A CONTAINER

CROSS-REFERENCE WITH RELATED APPLICATIONS

This application is a continuation of U.S. Ser. No. 13/958,220 filed Aug. 2, 2013, which issued Oct. 24, 2017 as U.S. Pat. No. 9,795,120, the contents of which are incorporated herein by reference.

TECHNICAL FIELD

The present disclosure relates to animal feeding methods and systems employing a container both for holding a consumable feed product that may be fed to an animal and for use as a growth medium from which seeds embedded within the container may grow and produce vegetation for animal consumption.

BACKGROUND

Biodegradable and compostable containers are known to provide consumers with a packaged product along with the added benefit of knowing the container will eventually degrade into its constituent components that are safe for the environment. Such containers may hold a wide variety of liquid products such as beverages, lotions and shampoo as well as dry goods such as food and supplies, and upon use of these products, the container may be discarded where it typically reaches a landfill or a recycling facility for degradation or recycling. In these cases, the container is only used to hold the product and is generally not used for other purposes. In the field of animal feed, such as in hobby farming where one or a small group of animals are fed, product is delivered from a container such as a feed bag, a tub, or wrapper, which is used once and then discarded.

SUMMARY

In view of the foregoing, implementations provide animal feeding methods and systems that employ a container having seeds embedded within the container body both to deliver to the animal a consumable feed product held within an interior space of the container and to serve as a growth medium from which seeds embedded within the container may grow and produce vegetation for the animal to consume. Such implementations may use a container formed of recycled or virgin materials and the container may generate essentially no waste as the materials may be consumable at least via the produced vegetation and biodegradable (e.g., compostable).

According to a first implementation, a method of feeding an animal a consumable feed product and vegetation involves delivering a consumable animal feed product to the animal from a container holding the feed product, where the container includes a body with embedded ungerminated seeds. The embedded seeds are caused to germinate and produce vegetation from the container body, and the vegetation is provided to the animal for consumption.

According to another implementation, a method of feeding a confined bird involves providing a container holding a consumable animal feed product including bird feed where the container body includes embedded ungerminated seeds. The confined bird is fed the consumable feed product from the container, the seeds embedded in the container body are caused to germinate, and the confined bird is fed the germinated seeds.

In yet another implementation, a feeding system for feeding an animal a consumable feed product and produced vegetation involves providing at least a first container and a second container, where each of the containers are adapted to hold a consumable feed product and include a container body with embedded ungerminated seeds. The seeds embedded in the container body of the first container are caused to germinate during a germination period. At least a portion of the germinated seeds are fed during a germinated seed feeding period, and a consumable feed product held within the second container is fed during a product feeding period. At least a portion of the product feeding period associated with product fed from the second container coincides with at least a portion of one or more of the germination period and the germinated seed feeding period associated with the first container.

BRIEF DESCRIPTION OF THE DRAWINGS

FIG. 1 is a schematic illustrating product feeding periods, growth periods and vegetation feeding periods for multiple containers that may be used according to implementations of the present disclosure.

DETAILED DESCRIPTION

Feeding methods and systems involve delivering consumable feed products to animals from containers that are adapted to be at least partially consumable by way of vegetation produced from seeds embedded in the container body. The systems and methods may be particularly useful for feeding confined animals that consume feed and vegetation such as animals in hobby farms and small pets.

According to certain implementations, methods and systems of feeding animals consumable feed products and vegetation involves feeding an animal or a group of animals a feed product that is held in a container, where the container body includes embedded ungerminated seeds. The embedded seeds may be caused to germinate and produce vegetation, and the vegetation may then be fed or offered to the animal or group of animals having ingested the consumable feed product. Multiple containers may be used in feed systems so that feed and vegetation may be provided to the animal over time, which is described further below.

The feeding systems and methods may be applicable to a variety of animals such as confined animals, including livestock animals, companion animals, small furred animals, small herbivore pet species, exotic animals, herbivore and *omnivore* aquatic animals and so on. In some examples, birds such as poultry and chicks may benefit from ingesting the consumable feed products and vegetation such as sprouting grass produced from grass seed embedded in the container having held such feed product. In further examples, companion animals such as cats may ingest feed or supplemental feed from the container and may enjoy cat nip grass grown from seeds embedded within the container body. Other animals may benefit from feeding systems and methods in which the animal consumes feed from a container and germinated seeds and/or vegetation produced from the container body and accordingly the present disclosure is not limited to methods of feeding those animals described above.

The container holding the consumable feed product may define an interior space for holding a consumable feed product, described below, and the material defining the container may include embedded seeds. The container may be a bottle, a feed receptacle, a bag and so on. As may be appreciated, the container is formed of a body with sidewalls, a top wall and a bottom wall and may include a cap, a handle, a spout and so on; and according to the present disclosure, the container body or portions thereof may include the embedded seeds. The size of the container may vary, but generally the container may be sized and shaped to define an interior that holds enough consumable feed product to deliver feed or a supplemental feed to one or a group of animals for a predefined period of time, such as several days or weeks. In a further example, the container may be a lidded container with a handle and spout. In still a further example, the container may be adapted for use as an open feed container to allow the confined animal to consume the feed ad libitum.

The material forming the container or a portion of the container with seeds embedded therein may be selected for its ability to serve as a growth medium from which the embedded seeds may grow. The material may include natural fibers such as paper, cardboard and other cellulose-based materials; plastic or other polymers and so on. In addition, the container material may be biodegradable so that it may safely break down and may further be a compostable and may compost, e.g., degrade into soil, upon exposure to the environment. For example, the container may be formed of recycled paper, virgin paper, cardboard, corrugated cardboard or any combination of these, which may both be used as a growth medium for the embedded seeds and which are generally biodegradable and compostable.

The seeds embedded within the container may include ungerminated seeds such as grass seeds, wildflower seeds and so on. Such seeds may be selected for the target animal, for the seed germination rate or both. In some examples, seeds that germinate relatively rapidly such as those that begin to germinate within about 5 to about 14 days may be preferred. In addition, those seeds that rapidly germinate and sprout into vegetation attractive to the target animal may be particularly preferred. For example, birds, poultry and chicks enjoy both germinated seeds and sprouting grass derived from grass seed and thus containers holding bird, poultry or chick feed may include grass seed embedded within the container.

Seeds may be embedded within the container during its production. According to the present disclosure, seeds may be embedded when secured in a manner so as to not be removable while the container is in use for holding and distributing the consumable feed product. In some aspects, an embedded seed is a seed that is immersed in or adhered to the container material. For example, ungerminated seeds may be added to cellulose-based pulp during container production and may be dispersed and embedded in the container or portions thereof that are formed of dried pulp. In another example, the seeds may be adhered to one or more layers of corrugated cardboard. In this example, the seeds may be affixed to the exterior of one or more of the cardboard layers including the internal fluted layer, for example using biodegradable adhesives. During production of such containers, the seeds may be added in steps where the seed exposure to moisture is insufficient to cause germination. In some cases, this may involve a moisture dehydration step shortly after introduction of the ungerminated seeds. In addition, the ungerminated seeds may be provided with a protective coating prior to introduction into the container production process. For example, the seeds may be coated with a biodegradable layer that dissolves after a period of time that is generally longer than the length of time the seeds are exposed to moisture during the container production process. In this way, germination of the seeds during production may be avoided while allowing the seeds to germinate when intended by exposing the container or portions thereof to moisture for several hours or days to begin the germination process. In further aspects, the container may be produced with fertilizer agents and/or germination agents for facilitating germination and growth of the embedded seed. In addition, agents for facilitating the degradation of the container may be included in the container composition. In yet further aspects, the container may be provided with one or more removable protective layers to prevent the embedded seeds from germinating until removed. The protective layer may be formed as an external layer, an internal layer or a sub-layer, and may be removable using mechanical force, e.g., by peeling the layer off, by dissolving the layer in water and combinations and variations thereof.

The consumable feed product held within the space defined by the container may include a variety of animal feed products for the animals described above. Generally the feeds are dry feed that may be stored for an extended period. In a particular implementation, the consumable feed product may be tailored to birds that consume feed as well as vegetation, which include but are not limited to confined birds such as chickens and chicks and caged birds such as parakeets and parrots. The feed products may include dry feed components including pelleted feed; seeds; and cereal grains such as corn, rice, wheat, barley, sorghum, millet, oats, rye, buckwheat and quinoa; and macronutrients such as calcium and phosphorous. The feed products may contain nutrients that are balanced for the target animal and may include starch (e.g., carbohydrates), fat, protein, micronutrients and so on. In particular aspects, the feed product may include bird or poultry feed components such as soybean meal, alfalfa meal, corn, wheat, oats, barley, flax seed, fish meal and yeast. The aforementioned feed components are examples of the type of feed components that may be used as or in the consumable feed products of the present disclosure and are not meant to be limiting as those skilled in the art will appreciate other compositions may be used in addition to or as an alternative to those listed above.

The consumable feed products may be delivered to the animal by a user through distribution by hand feeding, by pouring the feed such as via a spout onto the ground or into a feeding receptacle or by offering the animal the feed from an opened container. The container may be used periodically over an extended period to deliver such feed, for example, where the container holds an amount of consumable feed product sufficient to feed one or multiple animals for several days or weeks. However, feeding the animal the consumable feed product may be accomplished using a variety of feeding methods and the aforementioned examples should not be construed as limiting.

The seeds embedded in the container may be caused to germinate and produce vegetation from the container using a variety of germination methods. Generally these steps may occur after the container has been emptied of the consumable feed product. In order to facilitate seed germination and growth, the container may be treated with water such as through soaking or immersing the container in a vessel holding water in order to initiate germination. In addition, the container may be placed in direct sunlight. In a further example, the container may include a removable protective layer, such as a water barrier layer, that may be removed prior to treatment. In yet a further example, the container material may include germinating agents, fertilizer or other components for facilitating such germination and growth, and these components may be activated upon exposure to moisture, sunlight, removal of a protective layer, and combinations of these. In some cases, the container may be broken down, flattened or otherwise manipulated in order to facilitate such treatments. The container may be subjected to one or more treatment methods to cause the embedded seeds to germinate, for example, over a period of several days, such as 7 to 14 days, and may be provided to the animal or animals upon germination for consumption and/or the germinated seeds may produce vegetation until provided to the animal or animals for consumption. In some implementations, vegetation may be consumed by the animal within about 5 to 14 days from germination. However, as vegetation growth varies depending on, for example, seed type and weather conditions, the length of time a user selects between treating the embedded seeds and feeding the vegetation may vary.

As the vegetation grows from the container, the container may partially biodegrade or compost, for example, where the container is formed of cellulose-based materials. After the embedded seeds have produced sufficient vegetation, the user may provide the vegetation and the container or undegraded remnants to the animals for consumption of the vegetation. After consumption of the vegetation, the container or material remaining from the container may biodegrade into components safe for the environment, and in some cases, may compost and degrade into soil.

In particular embodiments, the animal ingesting the consumable feed product will be the same animal ingesting the germinated seeds within and/or the vegetation grown from the container.

According to certain implementations, the container may be provided to or obtained by the user along with a set of instructions for how to use the container for both delivering feed and vegetation to the animal or animals. For example, the instructions may be provided on a label connected to the container body or the instructions may be printed on the container body. In some examples, the instructions may be for feeding the animal the consumable feed product, for causing the seeds embedded in the container body to germinate, for feeding to the animal germinated seeds and/or vegetation produced from the germinated seeds and combinations of these. In a further example, the set of instructions may include directions for using multiple containers simultaneously in an animal feeding system in which a consumable feed product and germinated seeds and/or vegetation grown from the container are provided to a target animal or group of animals. In this example, instructions may be provided for using one container as a vessel for delivering the consumable feed product and for using a second container to germinate embedded seeds and feed the germinated seeds and/or vegetation grown therefrom.

According to certain implementations, a system for feeding an animal or animals a consumable feed product and vegetation involves a user obtaining or being provided with one or multiple containers with embedded seeds and using the containers for purposes of delivering feed, germinated seeds and/or vegetation. Using one container, a feeding system involves the sequential delivery of feed from the container, germinating seeds embedded in the container, and providing the germinated seeds and/or vegetation produced therefrom for consumption. Using multiple containers, feeding systems may involve feed delivery, vegetation growth and vegetation delivery for the same period or overlapping periods of time. FIG. 1 is a schematic illustrating a feeding system 100 in which three containers, container 1, container 2 and container 3, are used over time in a manner that enables the simultaneous consumption of a feed product and vegetation. For example, using the first container (Container 1), embedded seeds may be caused to germinate and produce vegetation during a growth period ($G_{V1}$). This growth period may be preceded by a consumable feed product feeding period ($F_{CP1}$) using the container to feed an animal a consumable feed product held within the container. The vegetation produced from this first container may thereafter be fed to the animal during a vegetation feeding period ($F_{V1}$). Using a second container (Container 2), the consumable feed product held therein may be fed to the animal during a product feeding period ($F_{CP2}$). During this product feeding period, $F_{CP2}$, the first container may be simultaneously undergoing its germination period ($G_{S1}$), germinated seed feeding period ($F_{S1}$) growth period ($G_{V1}$) or its vegetation feeding period ($F_{V1}$). Where the product feeding period, $F_{CP2}$, and germinated seed feeding period, $F_{S1}$, or the vegetation feeding period, $F_{V1}$, overlap, the animal may simultaneously consume the animal feed product and the container material in the form of germinated seeds or vegetation.

According to further implementations, and with continued reference to FIG. 1, the feeding system 100 may use a third container (Container 3) in which the consumable feed product is held and the animal is fed therefrom during a product feeding period ($F_{CP3}$) associated with the third container. Using the second container, from which the product has been fed to the animal as described above, the embedded seeds may be caused to germinate ($G_{S2}$) and optionally produce vegetation during a growth period ($G_{V2}$). According to this implementation, the product feeding period associated with the product fed from the third container ($F_{CP3}$) may coincide with at least a portion of the vegetation feeding period associated with the vegetation produced from the first container, $F_{V1}$, and the growth period associated with the second container, $G_{V2}$. In this way it may be possible for the animal to simultaneously consume the animal feed product from the third container and the vegetation from the first container while vegetation grows from the second container for subsequent consumption, and such subsequent consumption may coincide with feeding the animal the feed product from yet another container, while vegetation grows from the third container. However, it will be appreciated from FIG. 1 that the containers may be used for feeding germinated seeds and/or vegetation, and in some instances, although the germinated seeds may be provided for consumption (e.g., $G_{S1,2,3}$), vegetation may grow therefrom prior to consumption by the animal and thus a germinated seed feeding period (e.g., $F_{S1,2,3}$) may transition into a vegetation growth period (e.g., $G_{V1,2,3}$) and potentially vegetation feeding period (e.g., $F_{V1,2,3}$).

In view of the foregoing, directly or shortly after germination of the embedded seeds, all or a portion of the germinated seeds may be delivered to the animal during a germinated seed feeding period. Accordingly, in a feeding system using multiple containers, a germinated seed feeding period for one container, may coincide with a product feeding period, a germination period, a germinated seed feeding period, a growth period for germinated seeds, and/or a vegetation feeding period for one or numerous other containers. Moreover, a portion of the germinated seeds may be reserved for vegetation growth during a growth period. As a result, feeding systems using the containers with embedded seeds may be designed in a variety of ways, and those skilled in the art will appreciate the exemplary embodiments described herein should not be construed as limiting.

In still further implementations, a container may include a set of instructions as described above, for example, so that the product feeding period associated with one container coincides with all or a portion of the germination period, seed feeding period, vegetation growth period or the vegetation feeding period associated with the other containers.

The preceding feeding systems may be particularly useful for confined birds such as poultry, chicks or pet birds, where the consumable feed product is bird feed and the embedded seed is grass seed. In a bird feeding system, for example, the bird may ingest simultaneously bird feed delivered from a first container and sprouting grass grown from a second container, while grass seed germinates from a third container for subsequent delivery to the bird.

In the present disclosure, the specific order or hierarchy of steps in the methods disclosed are examples of sample approaches and the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter. The form described is merely explanatory, and it is the intention of the following claims to encompass and include such changes.

While the present disclosure has been described with reference to various embodiments, it will be understood that these embodiments are illustrative and that the scope of the disclosure is not limited to them. These and other variations, modifications, additions, and improvements may fall within the scope of the disclosure as defined in the claims that follow.

What is claimed is:

1. A method of feeding an animal, the method comprising:
    delivering an animal feed product to the animal from a container holding the feed product, wherein the container comprises a body including ungerminated seeds embedded in and at least partially immersed beneath a surface of the body;
    after the animal consumes the feed product, causing the embedded and at least partially immersed seeds to germinate and produce vegetation; and
    feeding the animal the vegetation by providing to the animal the container body with the produced vegetation growing therefrom.

2. The method of claim 1, wherein causing the embedded and at least partially immersed seeds to germinate comprises immersing at least a portion of the container body in water.

3. The method of claim 1, wherein at least a portion of the container body is biodegradable.

4. The method of claim 1, wherein at least a portion of the container body is compostable, and wherein the method further comprises composting any material remaining from the container body after feeding the animal the vegetation.

5. The method of claim 1, wherein the animal is a confined animal.

6. The method of claim 1, wherein the embedded and at least partially immersed seed is encapsulated in a protective coating configured to dissolve after a period of time.

7. The method of claim 1, wherein the container comprises one or more removable protective layers configured to prevent the embedded and at least partially immersed seed from germinating until the one or more removable protective layers are removed.

8. The method of claim 7, wherein the one or more removable protective layers comprise an external layer, an internal layer, a sub-layer, or combinations thereof.

9. The method of claim 7, wherein the one or more removable protective layers are peelable, dissolvable, or both.

10. The method of claim 1, wherein the container is a first container and the step of causing the embedded in and at least partially immersed seeds in the container body of the first container to germinate is during a germination period, the method further comprising:
    providing a second container adapted to hold the consumable animal feed product, wherein the second container comprises a body with ungerminated seeds embedded in and at least partially immersed beneath a surface of the body;
    feeding the animal at least a portion of the germinated seeds during a germinated seed feeding period; and
    feeding the animal the consumable animal feed product held within the second container during a product feeding period,
    wherein the product feeding period associated with product fed from the second container coincides with at least a portion of one or more of the germination period or the germinated seed feeding period associated with the first container.

11. The method of claim 10, wherein the step of delivering the consumable animal feed product from the first container is during an initial feeding period, said initial feeding period preceding the germination period associated with the seeds of the first container.

12. The method of claim 10, further comprising:
    providing a third container holding the consumable animal feed product;
    feeding the animal the consumable animal feed product from the third container during a product feeding period associated with product fed from the third container; and
    causing the seeds embedded in and at least partially immersed beneath a surface of the container body of the second container to germinate and produce vegetation during a growth period associated with the seeds of the second container,
    wherein the product feeding period associated with the product fed from the third container coincides with at least a portion of the germination period associated with the germinated seeds from the first container and the growth period associated with the seeds of the second container.

13. The method of claim 10, wherein at least one of the containers includes a set of instructions, the set of instructions comprising one or more of instructions for feeding the animal the consumable animal feed product, for causing the embedded and at least partially immersed seeds to germinate, and for feeding the animal one or more of the germinated seeds or vegetation produced from the germinated seeds.

14. The method of claim 13, wherein the set of instructions further includes instructions for causing the product feeding period associated with product fed from the second container to coincide with at least the portion of one or more of the germination period and the germinated seed feeding period associated with the first container.

15. The method of claim 1, wherein the consumable product is bird feed and the embedded and at least partially immersed seed comprises grass seed.

16. The method of claim 15, wherein the bird feed is poultry feed.

17. A method of feeding a bird, the method comprising:
feeding the bird the consumable feed product from a container holding a consumable animal feed product, wherein the container comprises a body with ungerminated seeds embedded in and at least partially immersed beneath a surface of the body;
causing the seeds embedded in and at least partially immersed beneath a surface of the container body to germinate; and
feeding the bird at least a portion of the germinated seeds by providing to the bird the container with the germinated seeds growing therefrom.

18. The method of claim 17, wherein the consumable animal feed product comprises bird seed and the ungerminated seeds comprise grass seeds.

19. The method of claim 17, wherein:
the container includes a set of instructions, the set of instructions comprising one or more of instructions for feeding the bird the consumable feed product, for causing the seeds embedded in and at least partially immersed beneath a surface of the container body to germinate, and for feeding to the bird at least a portion of the germinated seeds, and
one or more of the steps of feeding the consumable feed product, causing germination and feeding the bird at least the portion of the germinated seeds are performed according to the set of instructions.

20. The method of claim 17, further comprising feeding the bird vegetation produced from another portion of the germinated seeds.

* * * * *